United States Patent
Terry

(10) Patent No.: US 7,984,171 B2
(45) Date of Patent: Jul. 19, 2011

(54) METHOD OF MONITORING NETWORK AND INTERNET CONNECTIONS IN A REAL-TIME ENVIRONMENT TO DETECT UNAUTHORIZED NETWORK CONNECTIONS AND UNAUTHORIZED NETWORK ACTIVITY WITHIN A 32/64-BIT PC OR SERVER OPERATING SYSTEM

(75) Inventor: Robert F. Terry, Old Hickory, TN (US)

(73) Assignee: CW International, LLC, Ellwood City, PA (US)

( * ) Notice: Subject to any disclaimer, the term of this patent is extended or adjusted under 35 U.S.C. 154(b) by 0 days.

(21) Appl. No.: 12/440,318

(22) PCT Filed: Sep. 7, 2007

(86) PCT No.: PCT/US2007/077934
§ 371 (c)(1),
(2), (4) Date: Apr. 26, 2010

(87) PCT Pub. No.: WO2008/031069
PCT Pub. Date: Mar. 13, 2008

(65) Prior Publication Data
US 2010/0228870 A1    Sep. 9, 2010

Related U.S. Application Data

(60) Provisional application No. 60/824,830, filed on Sep. 7, 2006.

(51) Int. Cl.
G06F 15/16    (2006.01)
G06F 15/177   (2006.01)
G06F 7/04     (2006.01)

(52) U.S. Cl. .............................. 709/229; 709/220; 726/3

(58) Field of Classification Search .................. 709/220, 709/229; 726/3
See application file for complete search history.

(56) References Cited

U.S. PATENT DOCUMENTS
2004/0039827 A1    2/2004    Thomas et al.

OTHER PUBLICATIONS

International Application No. PCT/US07/77934—International Search Report and Written Opinion of the International Searching Authority mailed Mar. 20, 2008.
ASPN, ActivePython 2.4 documentation [Retrieved from ActiveState Programmer Network, <URL:http://aspn.activestate.com/ASPN/docs/ActivePython/2.2/PyWin32/win32net_NetShareDel-meth.html>] Feb. 7, 2006.
Bergstrand et al., Localization of Spyware in Windows Environments [Retrieved from Blekinge Tekniska Högskola, <USL:http://basun.bth.se/tek/aps/mbo.nsf/(WebFiles)/D2A01F82B0145B42C1257206003344AC/$.FILE/SpyDetector7.pdf>], May 1, 2004.
Makofsky, Steven, Pocket PC Network Programming [Retrieved from Google Book Search, <URL:http://books.google.com/books?id=T0h_fHP8wpgC&printsec=frontcover&dq=Steven+Makofsky&lr=&ei=ahieR5-fG5y8zATpxoDxCg&sig=aOap0LmMilD4BK4NY0J5GZH55Dg>, Jul. 1, 2003.

Primary Examiner — John Follansbee
Assistant Examiner — Alan S Chou
(74) Attorney, Agent, or Firm — Miles & Stockbridge PC; David R. Schaffer, Esq.

(57) ABSTRACT

A method of monitoring all network communications, which includes a real-time analysis and intercepting of all connections, and determining whether those network connections, including all connections across the Internet, are authorized or unauthorized connections. If a connection is unauthorized, the connection may be terminated in a real-time environment and the logical communications port for authorized connections is re-established.

23 Claims, 13 Drawing Sheets

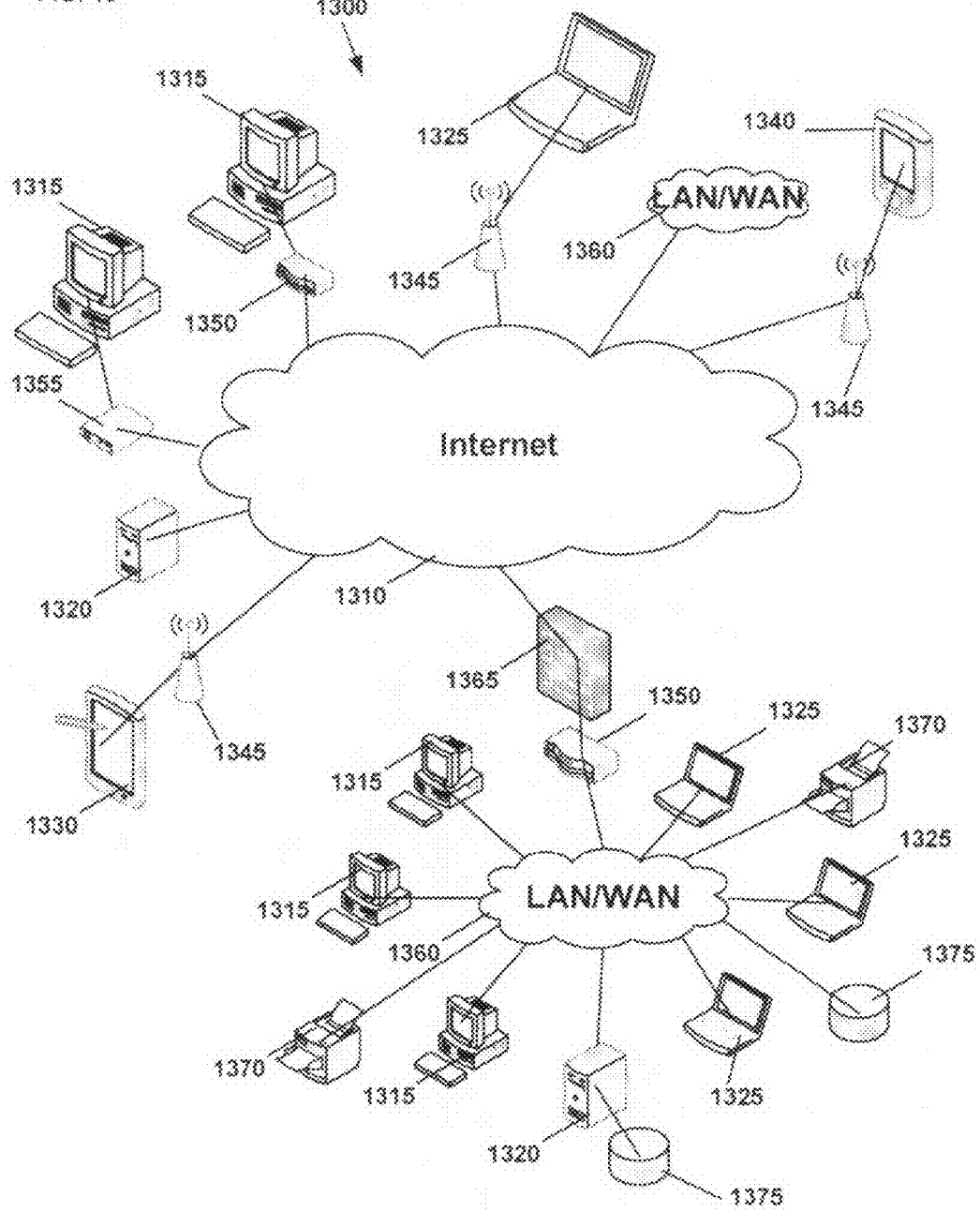

METHOD OF MONITORING NETWORK AND INTERNET CONNECTIONS IN A REAL-TIME ENVIRONMENT TO DETECT UNAUTHORIZED NETWORK CONNECTIONS AND UNAUTHORIZED NETWORK ACTIVITY WITHIN A 32/64-BIT PC OR SERVER OPERATING SYSTEM

CROSS REFERENCE TO RELATED APPLICATION

This application claims benefit of priority to U.S. Provisional Patent Application No. 60/824,830, filed Sep. 7, 2006, which is herein incorporated in its entirety by reference.

FIELD OF THE INVENTION

The present invention relates generally to the field of network utility professional programming, and more particularly but not exclusively, to network communications and methods of intercepting network communications and determining if the connections are authorized or unauthorized in a real-time environment.

BACKGROUND OF INVENTION

As networking and automation expands in business and organizations, one of the most important new technical capabilities in today's modern network computing is the ability for organizations to establish free local (host) networks for access to the Internet and other network service providers. In essence, organizations are allowing "connectivity" from their local area network, (LAN), to the Internet and any other public network, which can be accessed from the Internet. Many public corporations, private corporations, state and federal government, including the Department Of Defense, have established host LAN connection access for employees and visitors to those organizations. As an example, it would be very common to walk into a local coffee shop in a medium to large city and for that coffee shop to have free access to a wireless host LAN for access to the Internet.

Another issue, is that a 32/64-bit Microsoft computer automatically creates hidden "administrative shares" for its logical drives C:, D:, etc., which it names C$, D$, etc., respectively. The 32/64-bit Microsoft computer also creates an Admin$ hidden share for the \WINNT or \Windows folder. Domain administrators design these shares for remote access support. By default, if these administrative shares are deleted, they are automatically recreated when the computer is rebooted. These active "administrative shares" allow any individual user, to remotely log into a 32/64-bit Microsoft computer, if the remote user knows the system name and password of that particular computer. What compounds the issue is that an individual, who is allowed to access and utilize an organization's host LAN, frequently has 100% administrative access rights (i.e., privileges) to their computer, while they are connecting into and utilizing the host LAN. Other shares may also be of issue, including, but not limited to, an ipc$ share, which is a network share that is used to facilitate communication between processes and computers. This share is often used to exchange authentication data between computers.

The issue of establishing host LANs for public connection access is actually a "three way" problem. It is a problem for the host organization, if an individual utilizing the host LAN successfully breaks into an unauthorized area of the (host) LAN. It is a problem for the individual utilizing the host LAN, if an administrator of the host LAN gains unauthorized access to the individual's computer while that individual is utilizing the host LAN. It is a problem for the individual utilizing the host LAN, if another individual who is also utilizing the host LAN, gains unauthorized access to the other individual's computer, while they are both utilizing the host LAN.

The problem becomes much more complicated, when an organization attempts to apply the most current, common technology solutions available in the industry, to combat the problems as defined in the previous paragraphs.

The majority of the current technical solutions for these defined problems are firewalls and intrusion detection systems (IDS). The problem with a majority of these technical solutions is that parameters must be defined and applied in the form of policy "absolutes", without any consideration for allowing any use of logical ports or connections for other legitimate purposes. As an example, many personal firewalls simply have one of two possible configurations when installed and configured to function on a networked computer, which is either: 1) allow (i.e., enable) other computers to make a direct connection to this computer; or 2) disallow (i.e., disable) the ability for any other computer to make a direct connection to this computer. Unfortunately, there is no "middle of the road" margin for other policy options for connection scenarios. Additionally, many personal firewalls either allow a logical port to be opened for use, or the logical port must be permanently disabled. Again, there is no "middle of the road" margin for other policy options for logical port scenarios. In summary, when available technical solutions can only be applied in the form of policy "absolutes", these solutions are usually never applied as permanent security solutions in real-world operational networks.

While all the previous issues and problems stated are extremely important to the background of this invention, one that is more important than all of these issues and problems actually being identified and defined by the information system (IS) network security industry is commonly referred to as the "Inside Threat". Many experts in the IS network security industry believe that the real problem of the "Inside Threat" has not been solved and will not be solved for some time in the future.

In order to define the exact problem of the "Inside Threat", it is necessary to understand the fundamental mechanics of network operations and what must happen in order for a network to function as a network.

The fundamental design mechanics of a network requires that a network continuously publicly "broadcast" information throughout the network, in order to actually manage and maintain the operational integrity of the network. The information that is continuously broadcasted includes domain information regarding MAC (media access codes), Internet Protocol (IP) addresses, device configuration, status reporting, event signaling, etc. One can determine that if a network is required to publicly broadcast this information, in order to maintain itself in proper working order, then how would it be possible to secure and verify network communications (from the Inside Threat), if "all possible network connectivity" is continuously broadcast throughout the network?

In essence, this is the actual problem of the "Inside Threat", because for a network to function, the network must broadcast information, but at the same time the network is broadcasting information, a new technology is needed to protect the network from itself.

In summary, the true definition of the "Inside Threat", is the problem of protecting a network from itself in the course of the network performing its normal network operations.

In order to create a technical solution that will protect the network from itself and resolve the problem of the "Inside Threat", the solution must be dynamic, work in real-time conditions and allow network communications to function, until such time as an unauthorized event is detected, then terminate the event and reestablish the logical port for authorized communications.

As an example, a current state-of-the-art Microsoft 32-bit computer, or a 64-bit Microsoft computer, may be connected to a network (i.e., a host LAN), which is connected to the Internet, which in turn is connected to several other networks. This computer may have a user with administrative privileges and also have tools installed in that computer that allow the user to automatically "probe" the network to find security holes, weaknesses and available passwords to other computers. If the tools are successful in retrieving certain information, the user can gain access and log into another computer connected into the same network (i.e., host LAN) and successfully penetrate and retrieve any information from that computer. Therefore, the unauthorized access to another company can be successfully achieved, data extracted, new programs installed, without any knowledge of the unauthorized activity ever known by the host LAN administrators who manage the network. The terms Microsoft PC, Microsoft Server, Microsoft computer, Microsoft 32-bit computer, and/or any other similar variations and combinations using Microsoft to describe a specific computer, device and/or server may be used interchangeably to mean a computer, device and/or server on which a Microsoft operating system (O/S) is implemented.

Because of the problems described in the previous paragraphs, a new technology, such as, for example, but not limited to, a utility, is needed that has the ability to perform an analysis of a 32/64-bit Microsoft personal computer (PC) or Server from the time the computer is turned on (i.e., boots-up) and that can perform an analysis of a Microsoft computer's internal communications configuration, then can configure the computer for "secure communications", by only allowing direct connections inside the LAN from authorized computers with approved Internet protocol (IP) addresses. Additionally, the solution must configure the network computer to allow the use of all logical communication ports and if an unauthorized event occurs, then terminate the event and allow authorized communications to continue on the same logical port.

SUMMARY

In accordance with an embodiment of the present invention, a method of executing and performing an analysis of a computer's internal communications configuration, for example, a 32/64-bit Microsoft computer's internal communications configuration, includes (i.e., comprises) configuring the computer for "secure communications", by only allowing direct connections inside the host LAN from authorized computers with approved IP addresses. Additionally, the method configures the network computer to allow the use of all logical communication ports and, if an unauthorized event occurs, terminates the event, but allows authorized communications to continue on the same logical port.

BRIEF DESCRIPTION OF DRAWINGS

Non-limiting and non-exhaustive embodiments of the present invention are described with reference to the following figures, wherein like reference numerals refer to like parts throughout the various views unless otherwise precisely specified.

FIG. 13 is a diagram of a multiple network system that may be used together and/or separately in accordance with at least one embodiment of the present invention.

DETAILED DESCRIPTION OF ILLUSTRATED EMBODIMENTS

In the description herein, general details are provided in flow diagrams, to provide a general understanding of the programming methods that will assist in an understanding of embodiments of the inventive method(s). One skilled in the relevant art of programming will recognize, however, that the inventive method(s) can be practiced without one or more specific details, or in other programming methods. Terms referenced throughout this specification to "one embodiment" or "an embodiment" means that a particular feature, structure or characteristic described in connection with the embodiment is included in at least one embodiment of the present invented method. Thus, the appearance of the phrases "in one embodiment" or "in an embodiment" in places throughout this specification are not necessarily all referring to the same embodiment. Furthermore, the particular features, structures, or characteristics may be combined in any suitable manner in one or more various embodiments.

In accordance with one or more embodiments of the present invention, the O/S utility may be developed or implemented in a variety of programming languages ranging from low-level, programming languages (e.g., but not limited to, assembler) to high-level programming languages (e.g., but not limited to, C++, Visual Basic, Java, Java Beans, etc.). The O/S utility may be stored or encoded as an executable file on a machine-readable and/or a computer-readable medium (e.g., but not limited to, a floppy disk, a hard drive, a flash drive, a bubble memory, a Read Only Memory (ROM), a Random Access Memory (RAM), or the like) and/or hard-wired into one or more integrated circuits (e.g., an Electrically Erasable Programmable Read Only Memory (EEPROM), an Erasable Programmable Read Only Memory (EPROM), etc.).

Figure 1:
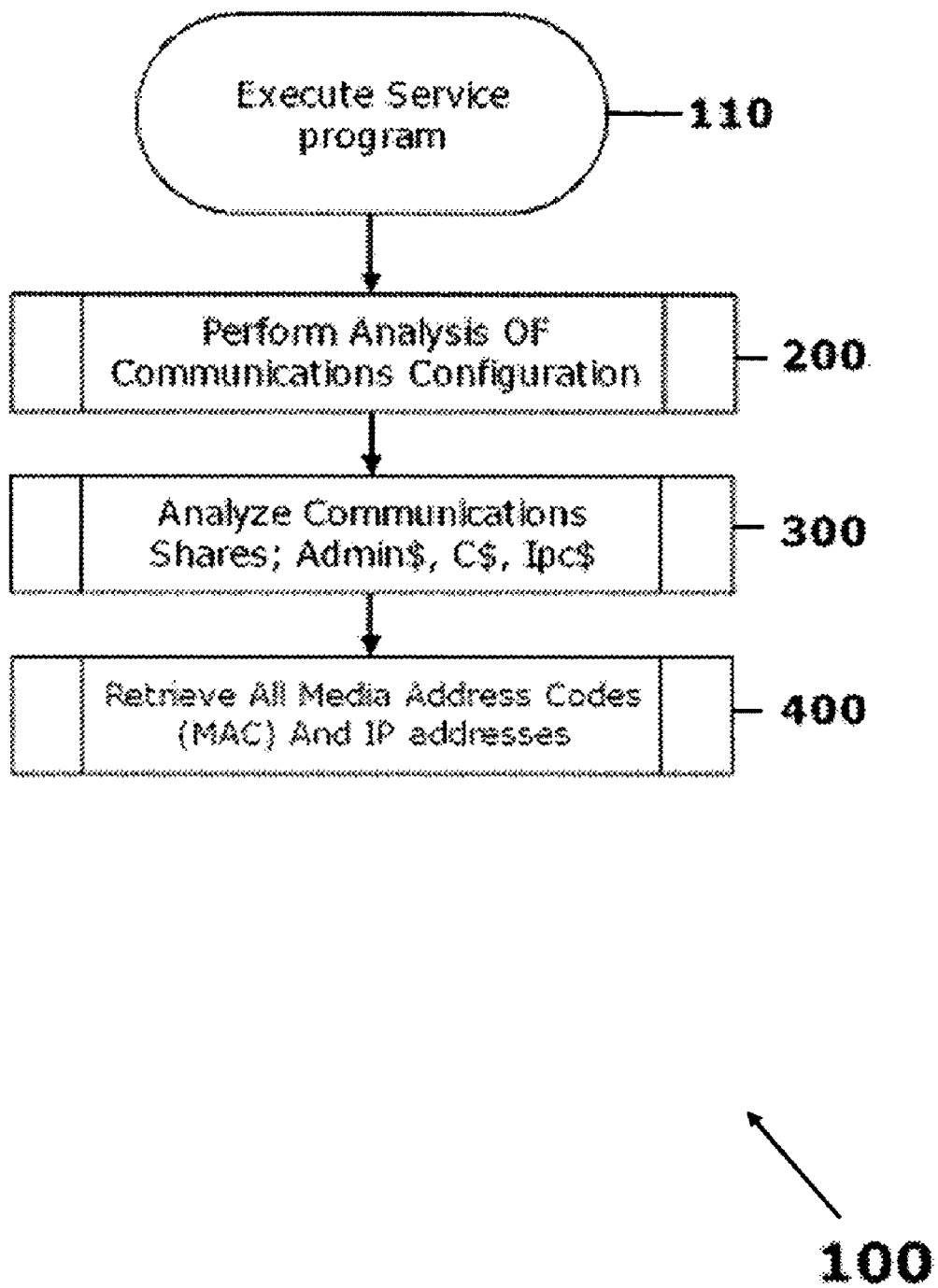
FIG. 1 is a general flow diagram of a method for executing and performing an analysis of the internal communications configuration which includes network shares (i.e., communications shares), IP Addresses and MAC codes, in accordance with at least one embodiment of the present invention.

FIG. 1 is a general flow diagram of a method 100 for executing and performing an analysis of the internal communications configuration which includes network shares (i.e., communications shares), IP Addresses and MAC codes, in accordance with at least one embodiment of the present invention. In FIG. 1, there is shown a method of executing (100) an O/S utility program as a service from the time the computer is powered-on (i.e., booted-up) and performing (200) a basic analysis of a communications configuration within the computer. The method may then modify and retrieve (300) the network shares configuration, and retrieve (400) all IP addresses and MAC codes to operate in a secure manner inside the host LAN.

Figure 2:
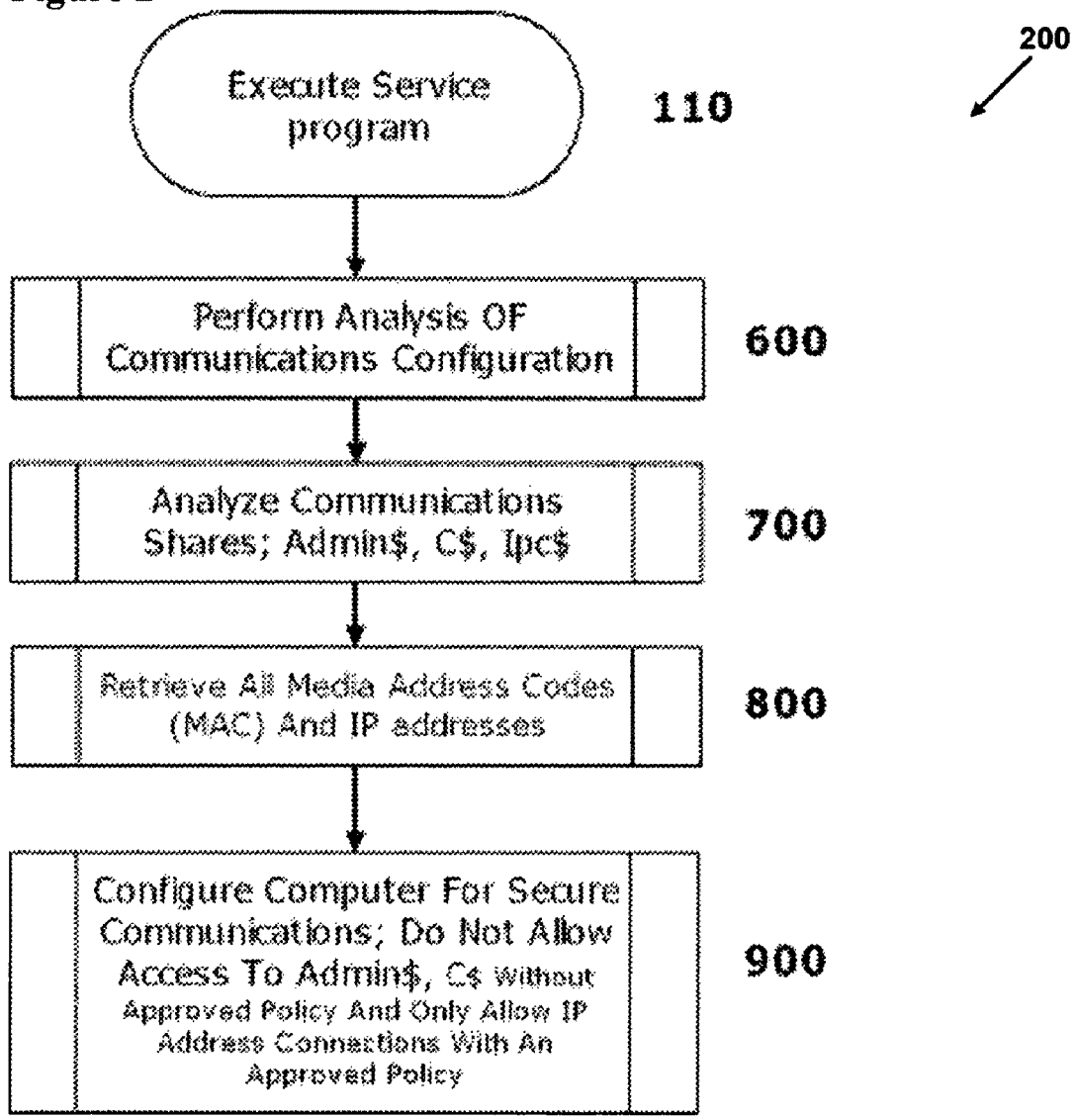
FIG. 2 is a general flow diagram of a method performed after the communications configuration is applied to the computer illustrating how the computer can perform a real-time analysis on events and determine if those events or authorized or unauthorized, in accordance with at least one embodiment of the present invention.

FIG. 2 is a general flow diagram of a method 200 that can be performed after the communications configuration is applied to the computer illustrating how the computer can perform a real-time analysis on events, and determine if those events or authorized or unauthorized, in accordance with at least one embodiment of the present invention. In FIG. 2, there is shown a method 100 that may begin by executing (110) a services program after the initial analysis of FIG. 1 has collected the communications configuration and then initiates its function to secure the communications, by performing (600) another real-time analysis of the communications configuration, retrieving (700) network shares (i.e., communications shares) configuration, retrieving (800) all IP addresses and MAC codes and then configuring (900) the computer for secure communications by activating a series of parallel threads to secure 100% of the communications of the computer. The parallel threads determine whether the communications activity is authorized or unauthorized and terminates the communications, if no policy is present to define the communications activity as an authorized event.

Figure 3:
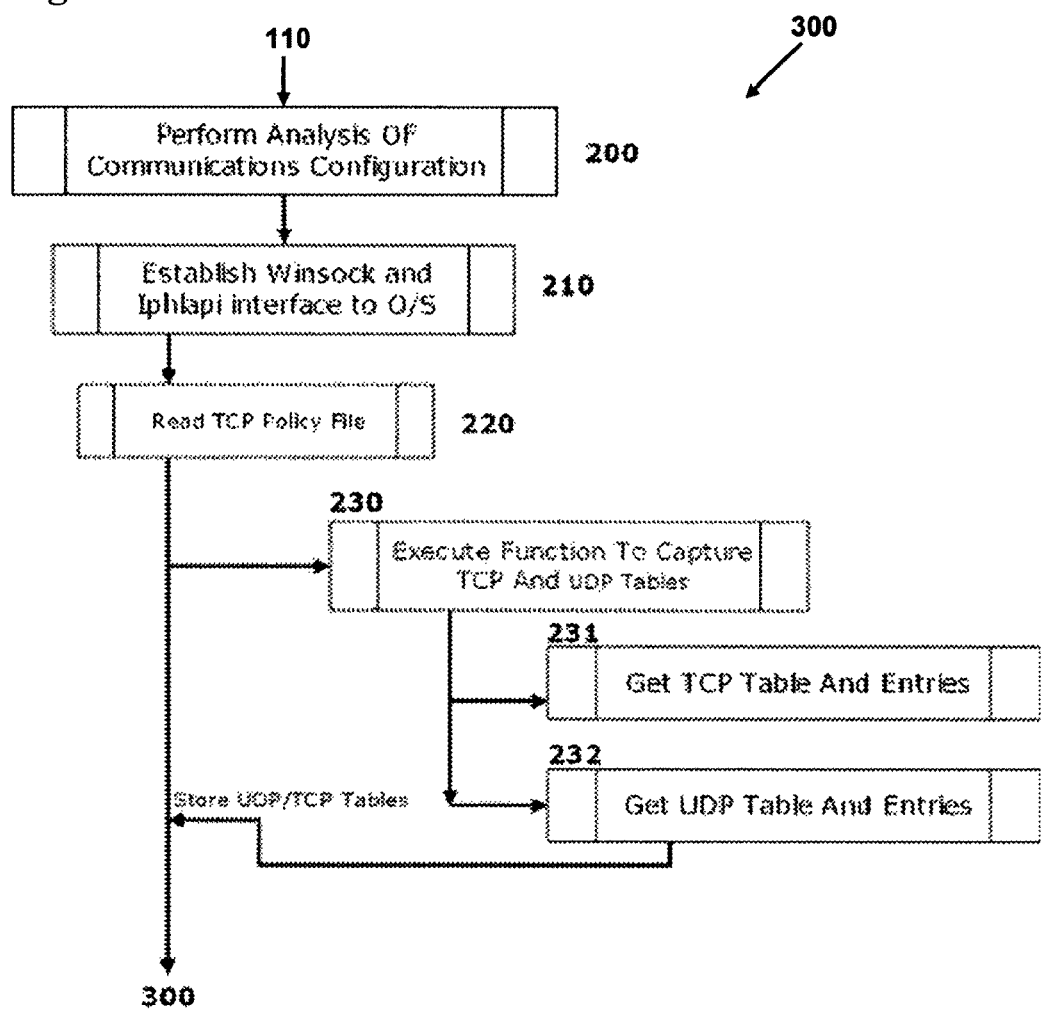
FIG. 3 is a detailed flow diagram of a method for establishing an interlink into an operating system API, such as, a Winsock (Windows Sockets API) or Iphlapi to capture transmission control protocol (TCP) and user datagram protocol (UDP) Table entries, in accordance with at least one embodiment of the present invention.

FIG. 3 is a detailed flow diagram of a method 300 for establishing an interlink into an operating system API, such as, a Winsock (Windows Sockets API) or Iphlapi to capture transmission control protocol (TCP) and user datagram protocol (UDP) Table entries, in accordance with at least one embodiment of the present invention. In FIG. 3, details of the service program performing (200) the analysis function include establishing (210) an interlink/interface into the operating system Winsock, then reading (220) the TCP policy file, if present. If the TCP policy file is present, a function is then executed (230) to capture the TCP and UDP tables (entries). When the TCP table and UDP table entries are received (231, 232, respectively), the service program continues to the modify and retrieve (300) network shares function.

Figure 4:
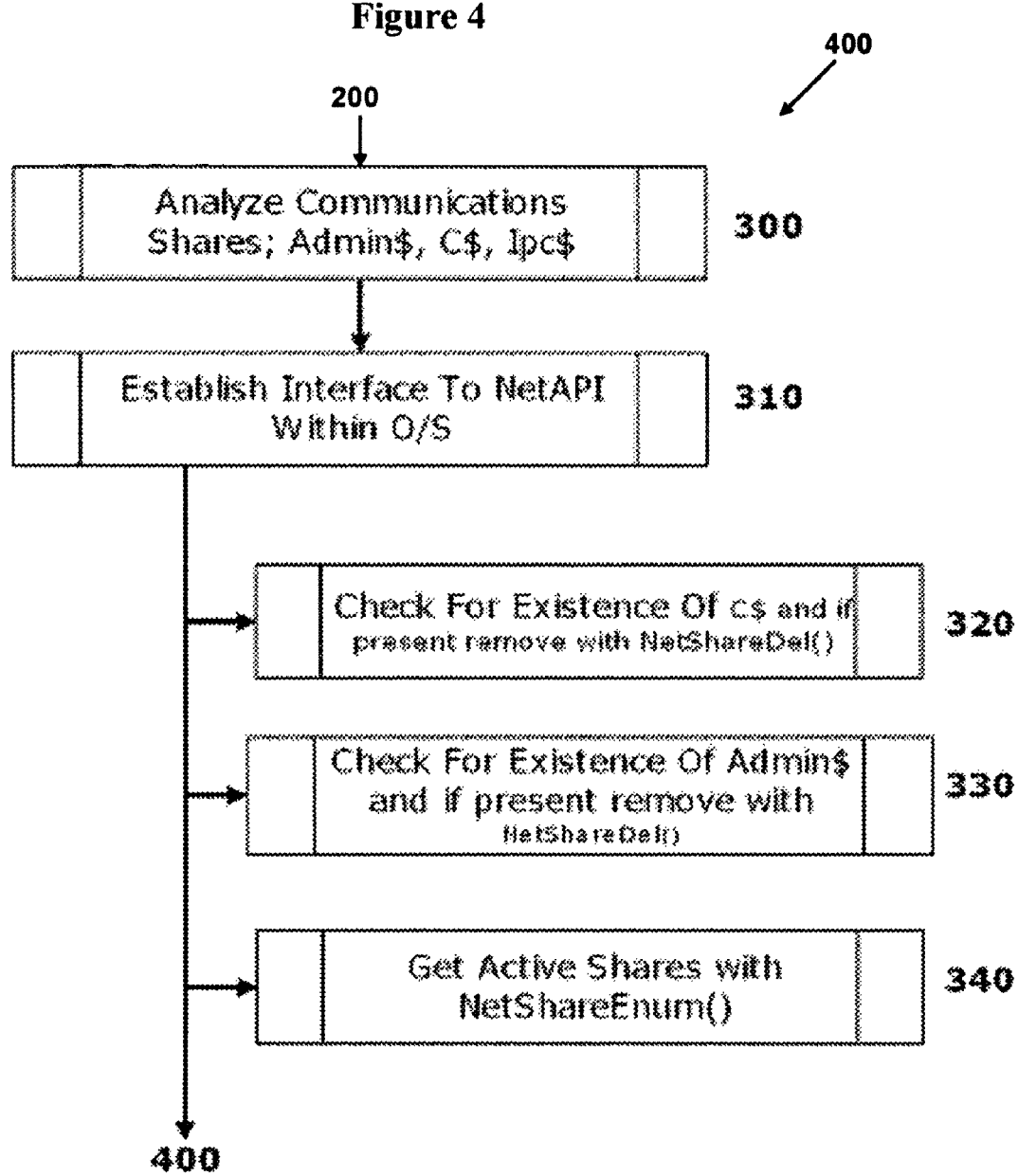
FIG. 4 is a detailed flow diagram of a method for establishing an interlink into an operating system API, such as, NetAPI, to check for the existence of specific network shares (i.e., communications shares) and to retrieve all remaining active network shares, in accordance with at least one embodiment of the present invention.

FIG. 4 is a detailed flow diagram of a method 400 for establishing an interlink into an operating system API, such as, NetAPI, to check for the existence of specific network shares (i.e., communications shares) and to retrieve all remaining active network shares, in accordance with at least one embodiment of the present invention. In FIG. 4, details of the service program performing communications analysis by initiating (300) a function to analyze and capture network shares communication are shown. The first step may be to establish (310) an interlink/interface into the operating system API, such as, for example, NetApi (O/S API), then execute (320) a function specifically configured to check for the existence of C$ and Admin$ and, if these shares are present, to delete (i.e., remove) (330) these shares with NetShareDel( ) to prevent a possible security threat from C$ and Admin$ shares. The final step is to capture all remaining active shares by executing (340) a NetShareEnum( ) function and recording this information into a data file and then continuing to the retrieving (400) all MAC codes and IP addresses function.

Figure 5:
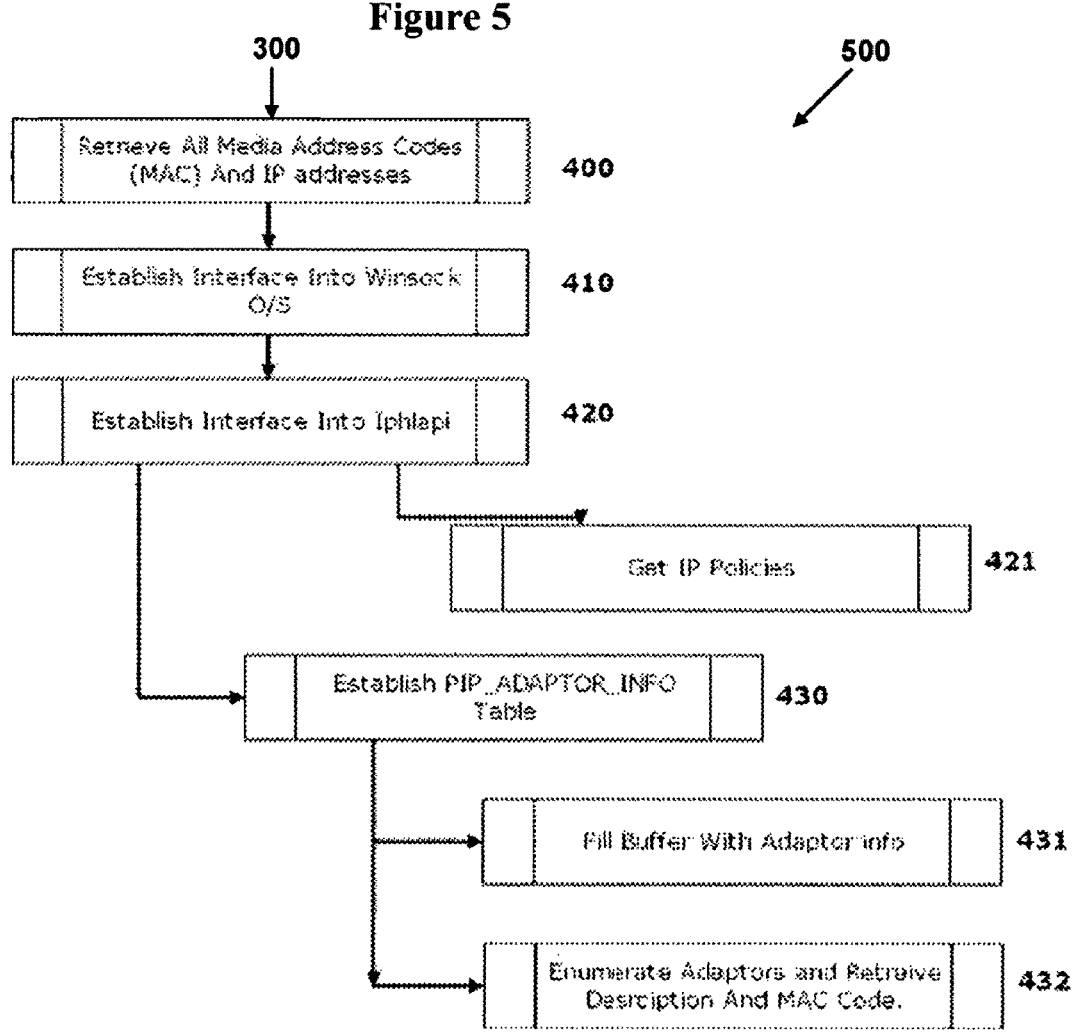
FIG. 5 is a detailed flow diagram of a method for establishing an interlink into an operating system Winsock and Iphlapi (operating system API) to enforce IP policies and to retrieve the hardware/network adaptor MAC codes installed within the computer, in accordance with at least one embodiment of the present invention.

FIG. 5 is a detailed flow diagram of a method for establishing an interlink into an operating system Winsock and Iphlapi (operating system API) to enforce IP policies and to retrieve the hardware/network adaptor MAC codes installed within the computer, in accordance with at least one embodiment of the present invention. In FIG. 5, details of the service program retrieving (400) all Media Access Codes (MAC) and IP addresses are shown. The first steps may be to establish (410) an interlink/interface into the operating system Winsock and to establish (420) an interlink/interface into the operating system Iphlapi (O/S Api) and retrieving (421) the data file IP policies, if present, which authorize formal TCP connections. Once the interfaces/interlinks into the Winsock and Iphlapi are established (410, 420, respectively) and the IP policy file is retrieved, if present, the next function may establish (430) a PIP_ADAPTOR_INFO Table and fill (431) a buffer with the adaptor information. The function may then traverse (i.e., enumerate) (432) the adaptor table to record all MAC codes utilized by the computer.

Figure 6:
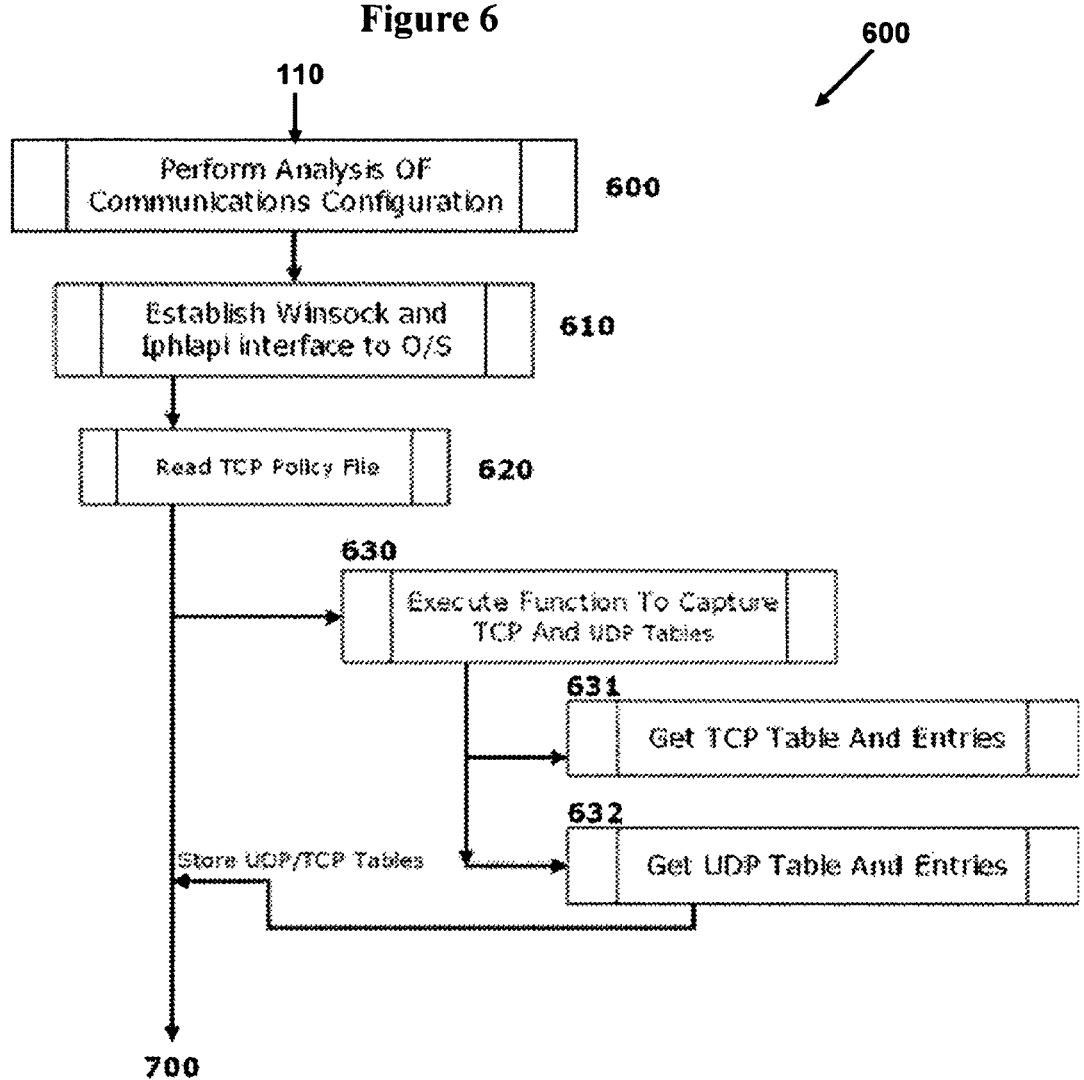
FIG. 6 is a detailed flow diagram of a method performed after the initial installation and analysis of the computer, to capture and store all TCP and UDP tables and entries, in accordance with at least one embodiment of the present invention.

FIG. 6 is a detailed flow diagram of a method 600 that can be performed after the initial installation and analysis of the computer, to capture and store all TCP and UDP tables and entries, in accordance with at least one embodiment of the present invention. In FIG. 6, details of the service program after it has completed an initial analysis of the computer, as shown in FIGS. 1, 3, 4 and 5, and is executing (600) its protection functions over the communications of the computer are shown. Even though a specific analysis has been previously performed on the communications, each time the service program starts thereafter, it will re-verify (600) the proper communications configuration (i.e., state) of the computer by establishing (610) a interface/interlink into the O/S Winsock and Iphlapi, reading (620) the IP policy file, and executing (630) a function to capture the TCP and UDP tables. Once the TCP and UDP tables are retrieved (631, 632, respectively), the service program can continue to gather communications information by proceeding to the analyzing (700) the network shares function.

Figure 7:
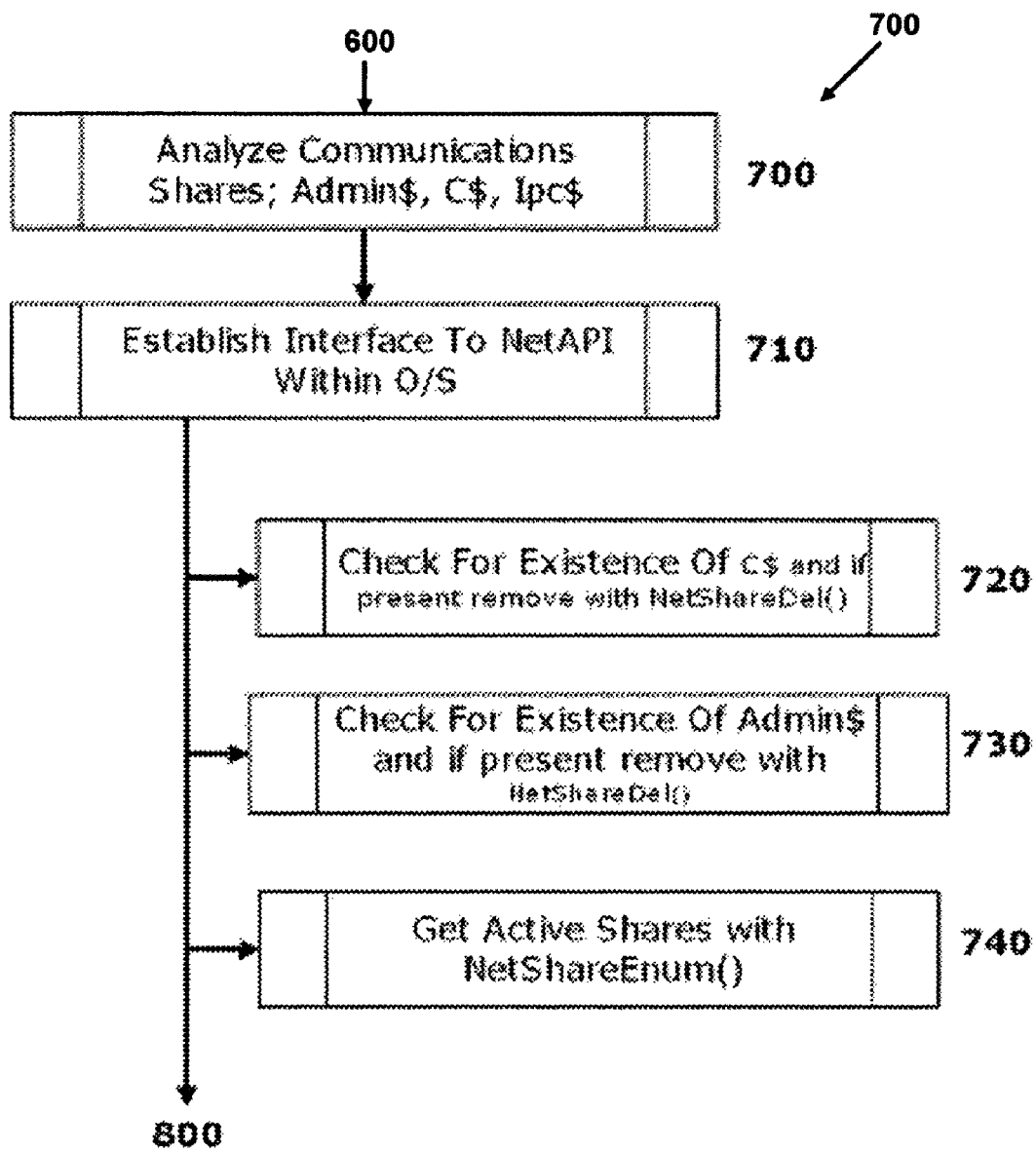
FIG. 7 is a detailed flow diagram of a method performed after the initial installation and analysis of the computer, to capture and store all active network share(s) activity, in accordance with at least one embodiment of the present invention.

FIG. 7 is a detailed flow diagram of a method 700 that can be performed after the initial installation and analysis of the computer, to capture and store all active network share(s) activity, in accordance with at least one embodiment of the present invention. In FIG. 7, details of the service program analyzing (700) the communications (network) shares, which are normally Admin$, C$ and IPC$ are shown. The analyzing (700) the communications (network) shares function may establish (710) an interlink/interface into a NetAPI operating system and check (720) for the existence of C$ and check (730) for the existence of Admin$ and, if present, delete (i.e., remove) these shares from being a potential security threat. Once the formal (i.e., general) shares are removed, the remaining (i.e., defined) shares may be captured (740) with the function NetShareEnum( ). Once these functions are completed, the service program may move to the retrieving (800) all IP addresses and MAC codes function.

Figure 8:
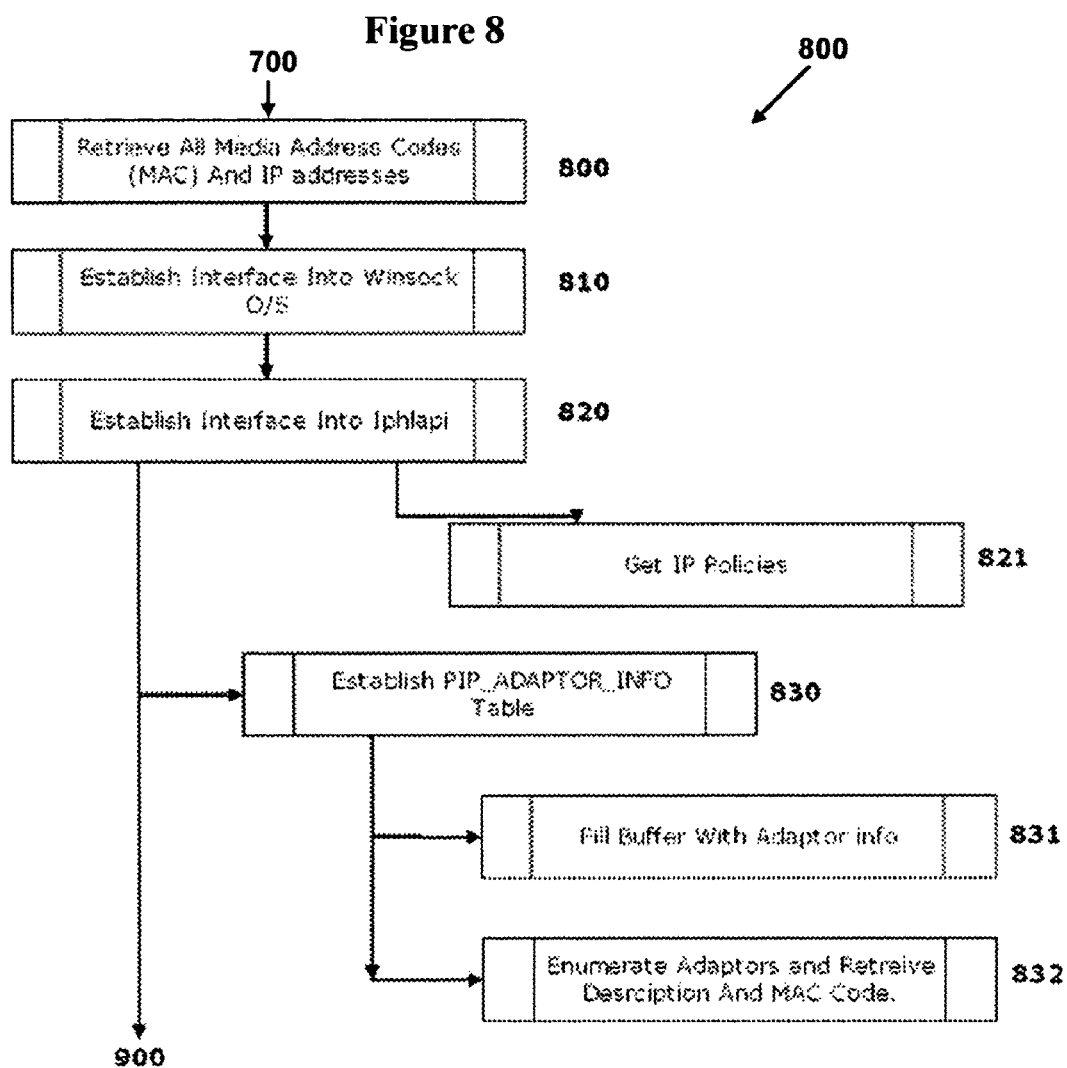
FIG. 8 is a detailed flow diagram of a method performed after the initial installation and analysis of the computer, to capture and store all IP addresses, established policies and computer/network adaptor information regarding all MAC codes, in accordance with at least one embodiment of the present invention.

FIG. 8 is a detailed flow diagram of a method 800 that can be performed after the initial installation and analysis of the computer, to capture and store all IP addresses, established policies and computer/network adaptor information regarding all MAC codes, in accordance with at least one embodiment of the present invention. In FIG. 8, details of the service program analyzing and retrieving (800) all Media Access Codes (MAC) and formal IP addresses assigned to the network circuit cards are shown. When the function is executed, it may establish (810) an interlink/interface into the O/S Winsock and establish (820) an interlink/interface into the O/S Iphlapi (O/S API) and also retrieve (821) the IP policy data file, if present. The function may then establish (830) a PIP_ADAPTOR_INFO Table and fill (831) the buffer with all adaptor information. Once the buffer is filled with all adaptor information, the adaptor table may be enumerated (832) to retrieve all MAC codes associates with each specific network adaptor. Once the adaptor information is retrieved, the function may move to it's final step of initiating (i.e., executing) (900) a series of parallel threads to manage and secure the communications within the computer.

Figure 9:
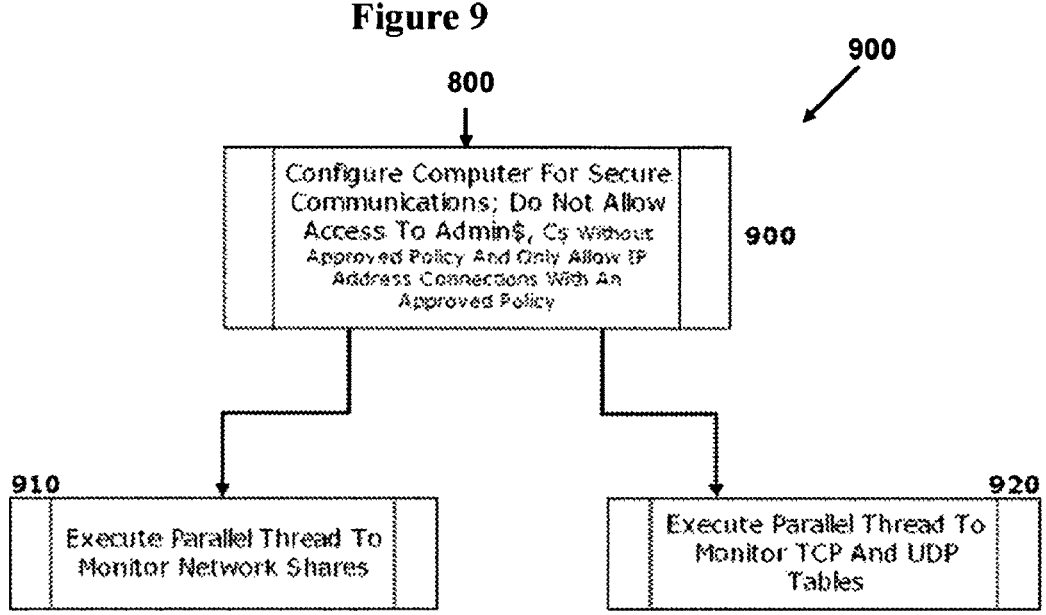
FIG. 9 is a detailed flow diagram of a method performed after the initial installation and analysis of the computer that start parallel threads to monitor all TCP/UDP tables (activity) and active network shares (i.e., communications shares), in accordance with at least one embodiment of the present invention.

FIG. 9 is a detailed flow diagram of a method 900 that can be performed after the initial installation and analysis of the computer to start parallel threads to monitor all TCP/UDP tables (activity) and active network shares (i.e., communications shares), in accordance with at least one embodiment of the present invention. As shown in FIG. 9, the service program can, after it has retrieved and secured the communications configuration (environment), start (900) two continuously cycling external parallel threads to monitor (910) the executing network shares (i.e., communications shares) and to monitor the communications activity regarding all TCP and UDP communications.

Figure 10:
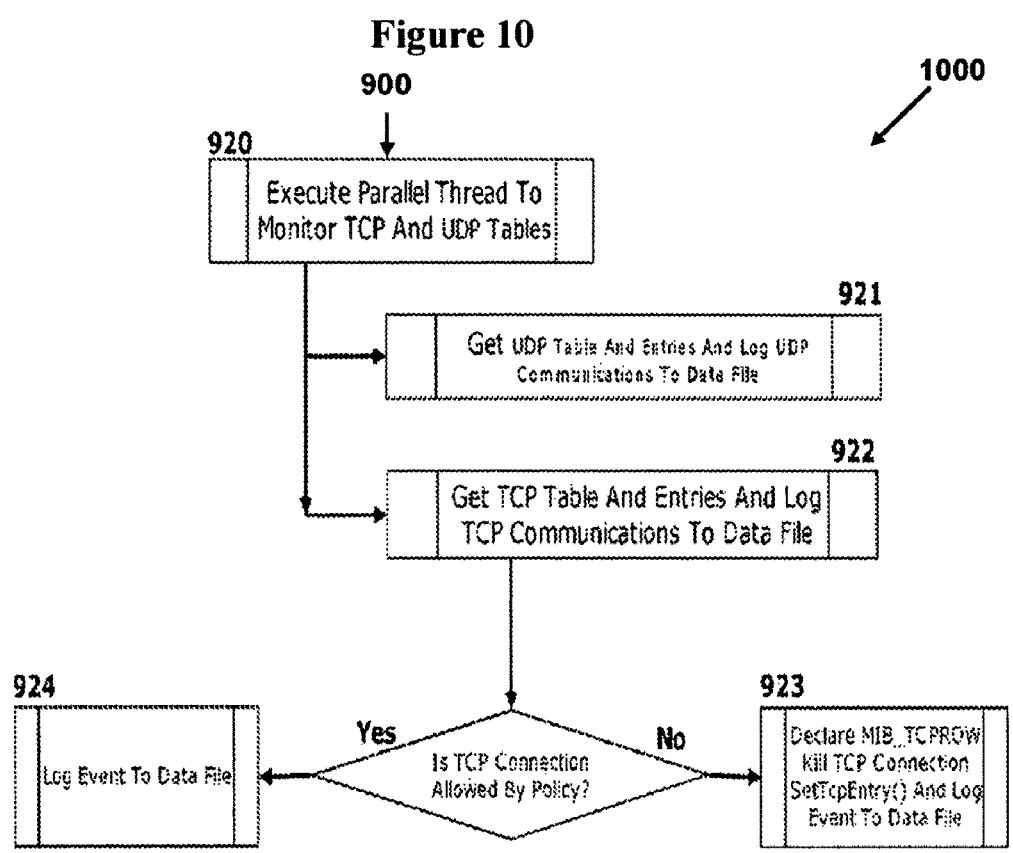
FIG. 10 is a detailed flow diagram of a method for monitoring the active TCP and UDP tables (i.e., connections) and determining if those connections are within policy (i.e., allowed) or not within policy (i.e., disallowed) and automatically disconnected, in accordance with at least one embodiment of the present invention.

FIG. 10 is a detailed flow diagram of a method 1000 for monitoring the active TCP and UDP tables (i.e., connections) and determining if those connections are within policy (i.e., allowed) or not within policy (i.e., disallowed) and automatically disconnected, in accordance with at least one embodiment of the present invention. In FIG. 10, details of the service program starting (i.e., executing) (920) the external parallel thread to monitor and secure all TCP and UDP communications are shown. In particular, the external parallel thread may retrieve (921) the UDP table and log the communications, then retrieve (922) the TCP table and log the communications. The external parallel thread may then cycle all active TCP and UDP connections and compare the connections to the IP policies defined as authorized connections to determine whether the connections are allowed. If a TCP connection is determined to have an approved IP Policy, the connection may be allowed to proceed and the event logged (924) into a data file. If the TCP connection is determined not to be authorized by an established IP policy, the TCP connection may be terminated (923) and the event logged into a data file. In accordance with at least one embodiment of the present invention, one or more data files may be used to log the connection events, for example, a single data file may be used to log both authorized and unauthorized connection events, or separate data files may be used to separately log the authorized and unauthorized connection events.

Figure 11:
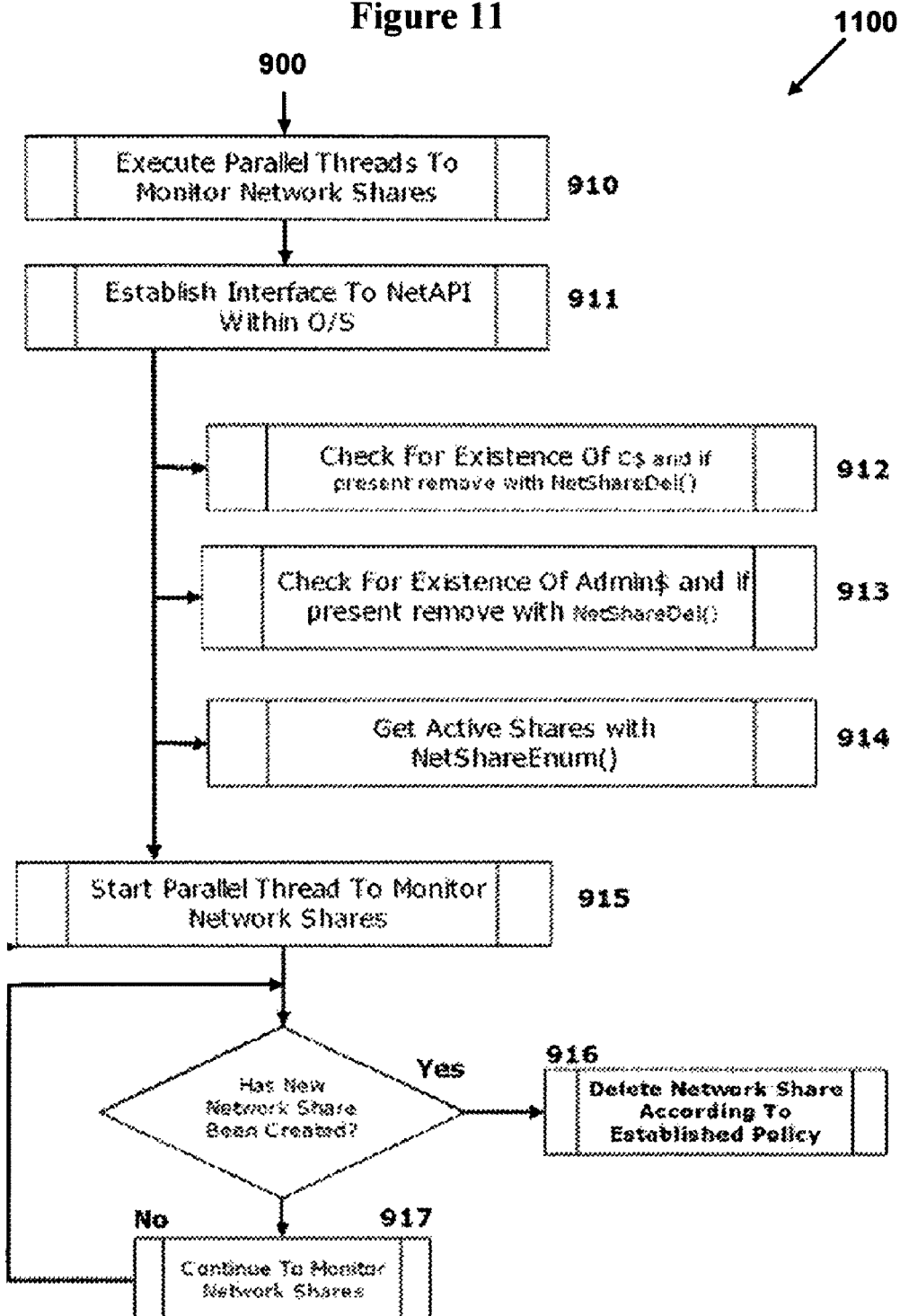
FIG. 11 is a detailed flow diagram of a method for monitoring the active network shares (i.e., communications shares), determining if network shares have been created and if so, removing (deleting) the unauthorized network share, in accordance with an embodiment of the present invention.

FIG. 11 is a detailed flow diagram of a method 1100 for monitoring the active network shares (i.e., communications shares), determining if network shares have been created and if so, removing (deleting) the unauthorized network share, in accordance with an embodiment of the present invention. In FIG. 11, details of the service program starting (i.e., executing) (910) the external parallel thread to monitor and secure all network share(s) activity are shown. In particular, the parallel thread may establish (911) an interlink/interface into the NetAPI operating system API, an then check (912, 913, respectively) for the existence of an administrative hard drive share and an administrative root folder share, C$ and Admin$, respectively, and, if present, delete these shares with NetShareDel( ) then retrieve (914) the remaining active shares by executing NetSharesEnum( ). Once these steps are completed, the parallel thread may execute (915) a polling cycle to continuously monitor network share activity. During the continuous monitoring, if a new share is determined to have been dynamically created, the network share may be automatically deleted. If no network share is created, the parallel thread may loop back to continue to monitor the configuration state of the computer's network shares (i.e., communications shares).

Figure 12:
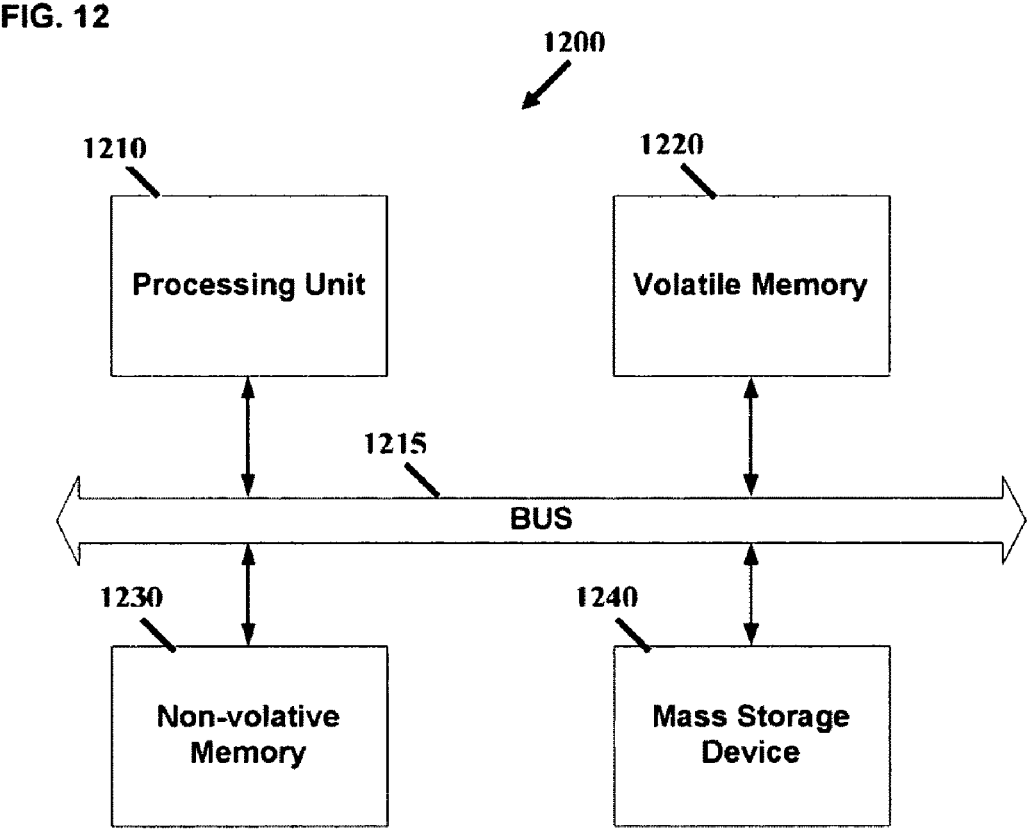
FIG. 12 is a block diagram of a computer system that may be used in accordance with at least one embodiment of the present invention.

FIG. 12 is a block diagram of a computer system 1200 that may be used in accordance with at least one embodiment of the present invention. In FIG. 12, a computer system 1200 may include, but is not limited to, a processing unit (e.g., a processor) 1210 connected to a bus 1215 to enable processing unit 1210 to have two-way communication across bus 1215. Computer system 1200 may also include a volatile memory (e.g., a random access memory (RAM)) 1220 to store executable instructions and information/data to be used by the executable instructions when executed by processing unit 1210. Computer system 1200 may still further include a non-volatile memory (e.g., a read only memory (ROM)) 1230 to store instructions and static information for processing unit 1210, and a mass storage device (e.g., a hard disk drive, a compact disc (CD) and associated CD drive, an optical disk and associated optical disk drive, a floppy disk and associated floppy disk drive, etc.) 1240 that each may also be connected to bus 1215 to enable each to have two-way communication across bus 1215. In operation, embodiments of the present invention may be resident in processing unit 1210 while being executed. For example, executing programmed instructions may cause processing unit 1210 to be configured to perform the functions described herein. The computer system illustrated in FIG. 12 may provide the basic features of a computer/server system that may be used in conjunction with embodiments of the present invention.

It is contemplated that embodiments of the present invention may also be used with computer/server systems that include additional elements not included in computer system 1200 in FIG. 12. For example, these addition elements may include, but are not limited to, additional processing units (e.g., parallel processing units, graphics processing units, etc.), bridges and/or interfaces to a variety of peripherals (e.g., monitor, keyboard, mouse, printer, joystick, biometric devices, speakers, external communications devices (e.g., a LAN, a WAN, a modem, a router, etc.)).

Additionally, any configuration of the computer system in FIG. 12 may be used with the various embodiments of the present invention. The executable instructions (i.e., computer program) implementing the present invention may be stored in any memory or storage device accessible to processing unit 1210, for example, but not limited to, volatile memory 1220, mass storage device 1240, or any other local or remotely connected memory or storage device.

FIG. 13 is a diagram of a multiple network system that may be used together and/or separately in accordance with at least one embodiment of the present invention. In FIG. 13, Internet 1310 may have connected to it a variety of computers, servers and communications devices. For example, multiple desktop personal computers (PCs) 1315, servers 1320, lap top PCs 1325, tablet PCs 1330, and personal digital assistants (PDAs) 1340 may be connected to Internet 1310 via a variety of communications means. The communications means may include wireless access points 1345, such as seen connecting lap top PC 1325, tablet PC 1330, and PDA 1340 to Internet 1310; a router 1350, as seen connecting a desktop PC to Internet 1310; and a modem 1355, as seen connecting another desktop PC to Internet 1310. Internet 1310 may also be connected to a LAN and/or WAN 1360 via a firewall 1365 and router 1350. LAN and/or WAN 1360 in turn may be directly connected to multiple desktop PCs 1315, lap top PCs 1325, multiple printers 1370, one or more servers 1320, and one or more mass storage devices 1375, which may also be connected to one or more servers 1320. Although the diagram in FIG. 13 is not exhaustive of all of the possible configurations and implementations, it is provided to illustrate a general network structure in which embodiments of the present invention may be implemented. Therefore, additional configurations and pieces of equipment are contemplated as being used with one or more embodiments of the present invention.

In accordance with one or more embodiments, each of the features of the present invention may be separately and independently claimed. Likewise, in accordance with one or more embodiments, each utility program, program, and/or code segment/module may be substituted for an equivalent means capable of substantially performing the same function(s).

Thus has been shown embodiments of the present invention that may provide one or more means for executing and performing an analysis of a 32/64-bit Microsoft computer's internal communications configuration, then can configure the computer for "secure communications", by only allowing direct connections inside the host LAN from authorized computers with approved IP addresses. Additionally, the solution may configure the network computer to allow the use of all logical communication ports and if an unauthorized event occurs, then terminate the event and allow authorized communications to continue on the same logical port In accordance with an embodiment of the present invention, a method of designing client based technology that can be installed on Microsoft PC and Servers does not need any "middle ware" (appliance) dedicated network hardware, to perform an analysis of the communications configuration of a computer and secure the communications from unauthorized network connections in a real-time environment.

In accordance with one or more embodiments, each of the features of the present invention may be separately and independently claimed. Likewise, in accordance with one or more embodiments, each utility program, program, and/or code segment/module may be substituted for an equivalent means capable of substantially performing the same function(s).

In accordance with an embodiment of the present invention, a method as substantially shown and described herein.

In accordance with another embodiment of the present invention, a system and method as substantially shown and described herein.

In accordance with yet another embodiment of the present invention, a computer and method as substantially shown and described herein.

In accordance with still another embodiment of the present invention, a computer network and method as substantially shown and described herein.

Although the present invention has been disclosed in detail, it should be understood that various changes, substitutions, and alterations can be made herein. Moreover, although software and hardware are described to control certain functions, such functions can be performed using either software, hardware or a combination of software and hardware, as is well known in the art. Other examples are readily ascertainable by one skilled in the art and can be made without departing from the spirit and scope of the present invention as defined by the following claims.

What is claimed is:

1. A method of intercepting network communications to secure communications connections to a computer from unauthorized network connections in a real-time environment, the method comprising:
    performing an analysis of a communications configuration in a computer;
    analyzing a plurality of network shares in the computer;
    retrieving all media address codes (MAC) and Internet protocol (IP) addresses in the computer;
    configuring the computer for secure communications by not allowing access to an administrative root folder share and an administrative hard drive share, if no approved policy exists to define the communications activity as an authorized event, and allowing IP address connections only with an approved policy to define the communications activity as an authorized event;
    executing a first parallel thread to monitor the network shares in the computer by
        establishing an interface to an application programming interface (API) of an operating system of the computer,
        checking for the existence of an administrative hard drive share and, if present, removing it,
        checking for the existence of an administrative root folder share and, if present, removing it, and
        obtaining an active shares list,
        starting another parallel thread to monitor network shares, and, if a new network share has been created, deleting the new network share according to a predetermined policy, and
        continuing to monitor the network shares; and
    executing a second parallel thread to monitor TCP and UDP tables in the computer by
        retrieving the UDP table and entries and logging UDP communications to a data file, and
        retrieving the TCP table and entries and logging TCP communications to another data file and, if a TCP connection is not allowed by the approved policy, terminating the TCP connection and logging the event to said another data file or, if the TCP connection is allowed by the approved policy, logging the event to said another data file.

2. The method of claim 1 further comprising:
performing, initially, an initial analysis of the computer including
performing an analysis of an initial communications configuration in the computer,
analyzing a plurality of initial network shares, and
retrieving all initial media address codes (MAC) and initial Internet protocol (IP) addresses.

3. The method of claim 1 wherein the performing an analysis of a communications configuration in a computer comprises:
establishing a Winsock interface and an Iphlapi interface to an operating system in the computer;
reading an IP policy file; and
capturing a TCP table and a UDP table.

4. The method of claim 1 wherein the analyzing a plurality of network shares comprises:
establishing an interface to a network application programming interface (API) within the operating system;
checking for the existence of an administrative hard drive share and, if present, removing it from the computer;
checking for the existence of an administrative root folder share and, if present, removing it from the computer; and
obtaining an active shares list.

5. The method of claim 4 wherein the removing each of the administrative shares from the computer comprises:
removing the administrative share from the computer using a NetShareDel( ) function.

6. The method of claim 4 wherein the obtaining an active shares list comprises:
obtaining an active shares list using a NetShareEnum( ) function.

7. The method of claim 1 wherein the retrieving all media address codes (MAC) and Internet protocol (IP) addresses comprises:
establishing a Winsock interface to the operating system in the computer;
establishing the Iphlapi interface to the operating system in the computer and reading an IP policy file; and
establishing a PIP_ADAPTER_INFO table, filling a buffer with information associated with network adapters on the computer, and enumerating the network adapters in the table to retrieve all MAC codes and descriptions.

8. The method of claim 1 wherein the executing a first parallel thread to monitor network shares comprises:
establishing an interface to a NetAPI within the operating system of the computer;
checking for the existence of the administrative hard drive share and, if present, removing it;
checking for the existence of the administrative root folder share and, if present, removing it; and
obtaining the active shares list;
starting another parallel thread to monitor network shares, and, if a new network share has been created, deleting the new network share according to a predetermined policy, and continuing to monitor the network shares.

9. The method of claim 8 wherein the removing each of the administrative shares from the computer comprises:
removing the administrative share from the computer using a NetShareDel( ) function.

10. The method of claim 8 wherein the obtaining an active shares list comprises:
obtaining an active shares list using a NetShareEnum( ) function.

11. A machine-readable non-transitory medium having stored thereon a plurality of executable instructions for performing a method comprising:
performing an analysis of a communications configuration in a computer;
analyzing a plurality of network shares in the computer;
retrieving all media address codes (MAC) and Internet protocol (IP) addresses in the computer;
configuring the computer for secure communications by not allowing access to an administrative root folder share and an administrative hard drive share, if no approved policy exists to define the communications activity as an authorized event, and allowing IP address connections only with an approved policy to define the communications activity as an authorized event,
executing a first parallel thread to monitor network shares in the computer by
establishing an interface to a NetAPI within an operating system of the computer,
checking for the existence of an administrative hard drive share and, if present, removing it,
checking for the existence of an administrative root folder share and, if present, removing it, and
obtaining an active shares list,
starting another parallel thread to monitor network shares, and, if a new network share has been created, deleting the new network share according to a predetermined policy, and
continuing to monitor the network shares; and
executing a second parallel thread to monitor TCP and UDP tables in the computer by
retrieving the UDP table and entries and logging UDP communications to a data file, and
retrieving the TCP table and entries and logging TCP communications to another data file and, if a TCP connection is not allowed by the approved policy, terminating the TCP connection and logging the event to said another data file or, if the TCP connection is allowed by the approved policy, logging the event to said another data file.

12. The machine-readable non-transitory medium of claim 11 further comprising:
performing, initially, an initial analysis of the computer including
performing an analysis of an initial communications configuration in the computer,
analyzing a plurality of initial network shares, and
retrieving all initial media address codes (MAC) and initial Internet protocol (IP) addresses.

13. The machine-readable non-transitory medium of claim 11 wherein the performing an analysis of a communications configuration in a computer comprises:
establishing a Winsock interface and an Iphlapi interface to an operating system in the computer;
reading an IP policy file; and
capturing a TCP table and a UDP table.

14. The machine-readable non-transitory medium of claim 11 wherein the analyzing a plurality of network shares comprises:
establishing an interface to a network application programming interface (API) within the operating system;
checking for the existence of an administrative hard drive share and, if present, removing it from the computer;

checking for the existence of an administrative root folder share and, if present, removing it from the computer; and obtaining an active shares list.

15. The machine-readable non-transitory medium of claim 11 wherein the retrieving all media address codes (MAC) and Internet protocol (IP) addresses comprises:
establishing a Winsock interface to the operating system in the computer;
establishing the Iphlapi interface to the operating system in the computer and reading an IP policy file; and
establishing a PIP_ADAPTER_INFO table, filling a buffer with information associated with network adapters on the computer, and enumerating the network adapters in the table to retrieve all MAC codes and descriptions.

16. The machine-readable non-transitory medium of claim 11 wherein the executing a first parallel thread to monitor network shares comprises:
establishing an interface to a NetAPI within the operating system of the computer;
checking for the existence of the administrative hard drive share and, if present, removing it;
checking for the existence of the administrative root folder share and, if present, removing it; and
obtaining the active shares list;
starting another parallel thread to monitor network shares, and, if a new network share has been created, deleting the new network share according to a predetermined policy, and continuing to monitor the network shares.

17. An apparatus comprising a computer system including a processing unit and a volatile memory, the computer system including:
means for performing an analysis of a communications configuration in a computer;
means for analyzing a plurality of network shares in the computer;
means for retrieving all media address codes (MAC) and Internet protocol (IP) addresses in the computer;
means for configuring the computer for secure communications by not allowing access to an administrative root folder share and an administrative hard drive share, if no approved policy exists to define the communications activity as an authorized event, and allowing IP address connections only with an approved policy to define the communications activity as an authorized event;
means for executing a first parallel thread to monitor network shares in the computer by
establishing an interface to a NetAPI within an operating system of the computer,
checking for the existence of an administrative hard drive share and, if present, removing it,
checking for the existence of an administrative root folder share and, if present, removing it, and
obtaining an active shares list,
starting another parallel thread to monitor network shares, and, if a new network share has been created, deleting the new network share according to a predetermined policy, and
continuing to monitor the network shares; and
means for executing a second parallel thread to monitor TCP and UDP tables in the computer by
retrieving the UDP table and entries and logging UDP communications to a data file, and
retrieving the TCP table and entries and logging TCP communications to another data file and, if a TCP connection is not allowed by the approved policy, terminating the TCP connection and logging the event to said another data file or, if the TCP connection is allowed by the approved policy, logging the event to said another data file.

18. The apparatus of claim 17 further comprising:
means for performing, initially, an initial analysis of the computer by
performing an analysis of an initial communications configuration in the computer,
analyzing a plurality of initial network shares, and
retrieving all initial media address codes (MAC) and initial Internet protocol (IP) addresses.

19. The apparatus of claim 17 wherein the means for performing an analysis of a communications configuration in a computer comprises:
means for establishing a Winsock interface and an Iphlapi interface to an operating system in the computer;
means for reading an IP policy file; and
means for capturing a TCP table and a UDP table.

20. The apparatus of claim 17 wherein the means for analyzing a plurality of network shares comprises:
means for establishing an interface to a network application programming interface (API) within the operating system;
means for checking for the existence of an administrative hard drive share and, if present, removing it from the computer;
means for checking for the existence of an administrative root folder share and, if present, removing it from the computer; and
means for obtaining an active shares list.

21. The apparatus of claim 17 wherein the means for retrieving all media address codes (MAC) and Internet protocol (IP) addresses comprises:
means for establishing a Winsock interface to the operating system in the computer;
means for establishing the Iphlapi interface to the operating system in the computer and reading an IP policy file; and
means for establishing a PIP_ADAPTER_INFO table, filling a buffer with information associated with network adapters on the computer, and enumerating the network adapters in the table to retrieve all MAC codes and descriptions.

22. The apparatus of claim 17 wherein the means for executing a first parallel thread to monitor network shares comprises:
means for establishing an interface to a NetAPI within the operating system of the computer;
means for checking for the existence of the administrative hard drive share and, if present, removing it;
means for checking for the existence of the administrative root folder share and, if present, removing it; and
means for obtaining the active shares list;
means for starting another parallel thread to monitor network shares, and, if a new network share has been created, deleting the new network share according to a predetermined policy, and continuing to monitor the network shares.

23. A method of intercepting network communications to secure communications connections to a computer from unauthorized network connections in a real-time environment, the method comprising:
performing an analysis of a communications configuration in a computer by
establishing a Winsock interface and an Iphlapi interface to an operating system in the computer, reading an IP policy file, and
capturing a TCP table and a UDP table;
analyzing a plurality of network shares in the computer by
- establishing an interface to a network application programming interface (API) within the operating system,
- checking for the existence of an administrative hard drive share and, if present, removing it using a NetShareDel( ) function,
- checking for the existence of an administrative root folder share and, if present, removing it using a NetShareDel( ) function, and
- obtaining an active shares list using a NetShareEnum( ) function;

retrieving all media address codes (MAC) and Internet protocol (IP) addresses in the computer by
- establishing the Winsock interface to the operating system in the computer,
- establishing the Iphlapi interface to the operating system in the computer and reading an IP policy file, and
- establishing a PIP_ADAPTOR_INFO table, filling the table with information associated with network adapters on the computer, and enumerating the network adapters in the table to retrieve all MAC codes and descriptions; and configuring the computer for secure communications by not allowing access to the administrative root folder share and the administrative hard drive share, if no approved policy exists, and allowing IP address connections only with an approved policy, executing a first parallel thread to monitor network shares in the computer by
- establishing an interface to a NetAPI within the operating system of the computer,
- checking for the existence of the administrative hard drive share and, if present, removing it using,
- checking for the existence of the administrative root folder share and, if present, removing it, and
- obtaining the active shares list using a NetShareEnum( ) function,
- starting another parallel thread to monitor network shares, and, if a new network share has been created, deleting the new network share according to a predetermined policy, and
- continuing to monitor the network shares; and executing-a second parallel thread to monitor TCP and UDP tables in the computer by
- retrieving the UDP table and entries and logging UDP communications to a data file, and
- retrieving the TCP table and entries and logging TCP communications to another data file and, if a TCP connection is not allowed by the approved policy, terminating the TCP connection and logging the event to said another data file or, if the TCP connection is allowed by the approved policy, logging the event to said another data file.

* * * * *